E. G. GODDARD.
Car-Starters.
No. 150,023. Patented April 21, 1874.
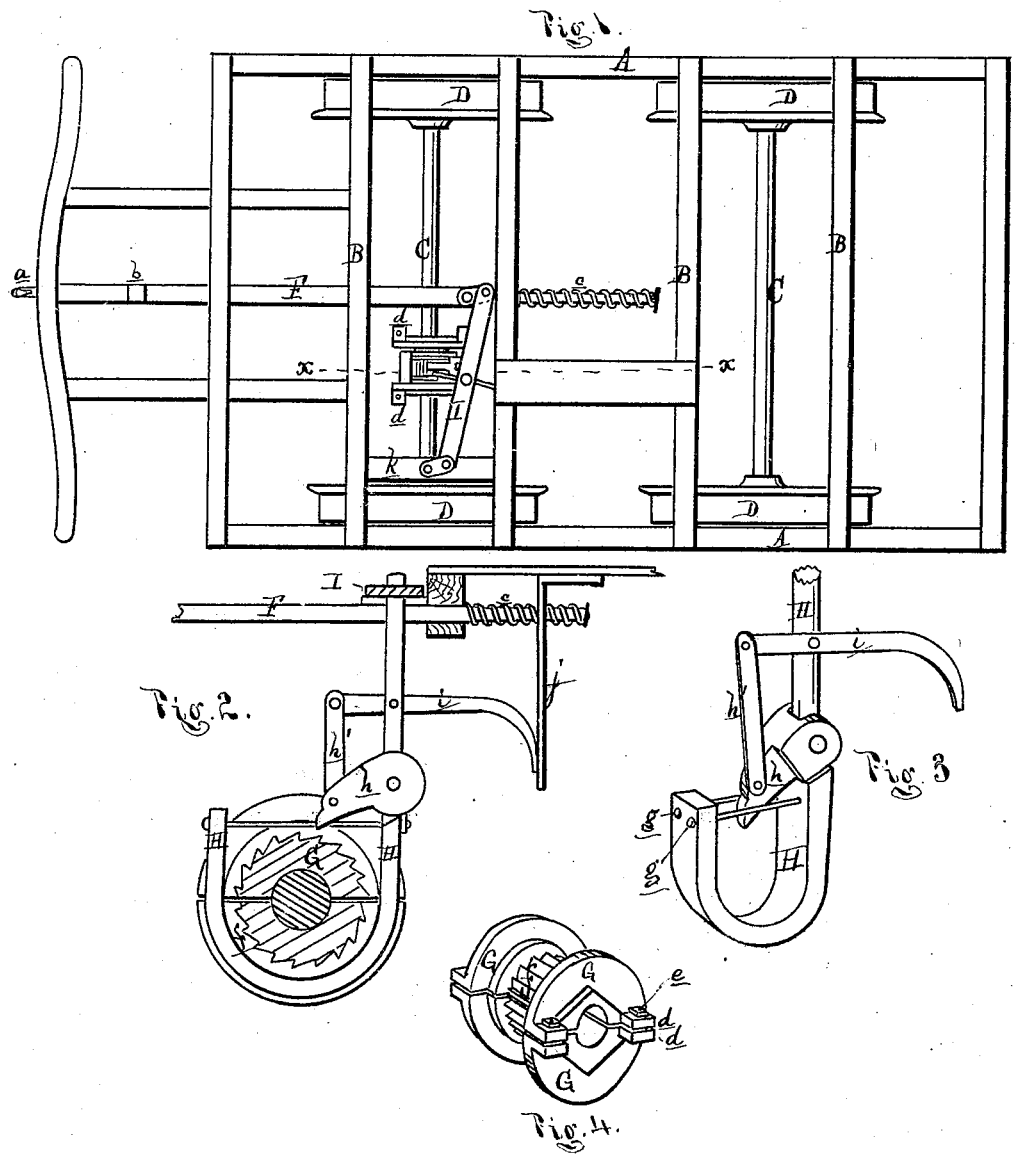

UNITED STATES PATENT OFFICE.

EZRA G. GODDARD, OF EAST SAGINAW, MICHIGAN.

IMPROVEMENT IN CAR-STARTERS.

Specification forming part of Letters Patent No. 150,023, dated April 21, 1874; application filed February 2, 1874.

*To all whom it may concern:*

Be it known that I, EZRA G. GODDARD, of East Saginaw, in the county of Saginaw and State of Michigan, have invented an Improvement in Car-Starters, of which the following is a specification:

This invention has for its object to provide a device which may be attached to one or both axles of a horse-car, to enable the horse or team to start the car with the expenditure of one-half the power required to start it where the connection is direct and rigid; and it consists in the peculiar construction of a ratchet on the axle, a pawl to engage with the same in starting the car, and actuated by a system of levers through a sliding draw-bar, as more fully hereinafter set forth.

Figure 1 is a plan of the sills and bed-frame of a horse-car with my starter attached. Fig. 2 is a partial longitudinal section at $x\ x$. Fig. 3 is a detached perspective view of the pawl-lever and attachments. Fig. 4 is a similar view of the ratchets.

In the drawing, A represents the sills, and B the floor-joists, which form the bed-frame of a horse-car. C C are the axles carrying the flanged wheels D, and journaled in the pedestals which support the bed-frame. F is a draw-bar, sliding in stirrups under the middle of the floor-joists to the space between the two middle joists, with a hook, $a$, at the front end, to which the horse or team is attached, a stop, $b$, behind the platform-joist, against which it strikes when the team is pulling the car, and a spring, $c$, coiled about it between a pin through the rear end and the last joist through which it passes, which spring retracts the draw-bar when the team ceases pulling. G G is a ratchet in two halves, with a flange at each side embracing the axle, with a pair of lugs, $d$, projecting from each side, securing the two halves on the axle by bolts $e$ passing through said lugs. The middle of the periphery is a toothed ratchet, $f$, at each side of which is a smooth collar, forming a bearing for a circular hook or segment turned at the lower end of a pawl-lever, H, a pair of tangent-bolts, $g$, passing through the point of the hook and the body of the pawl-lever, resting said bolts upon the smooth bearings just referred to. $h$ is a dog or pawl pivoted to the pawl-lever, its point passing between the tangent-bolts to the ratchet. To the pawl is pivoted the lower end of a lifter-rod, $h$, whose upper end is pivoted to the short arm of a lever, $i$, extending to the rear post and pivoted to the pawl-lever, behind which it is bent downward, striking against a pendent plate, $j$, spiked to the bed-frame, depressing that end of the lever $j$ when the draw-bar is retracted, and disengaging the pawl from the ratchet. The pawl-lever H passes up through a horizontal lever, I, one end of which rests upon and is pivoted to the draw-bar, and the other rests upon and is pivoted to a plate, K, bolted to two of the joists near one of the wheels.

As the draw-bar is pulled forward, the weight of the forward end of the lever $i$ and lifter-rod $h'$ cause the dog $h$ to engage with the ratchet $f$ and rotate the axle, the power applied through the levers being equal to the radius of the wheel, so that drawing out the draw-bar one foot, the periphery of the wheel travels one foot on the rail; hence but one-half the power as ordinarily applied is sufficient to start the car, after which the motion is kept up with the expenditure of but little force. When the pull on the draw-bar ceases, the spring retracts it, and, as the bent lever $i$ strikes the pendent plate $j$, the pawl $h$ is freed from the ratchet, leaving the axle free to be rotated in either direction.

The power required to start the car can be reduced to any degree by placing the radius or pawl lever in the lever I nearer the plate $k$. In the present case the engagement is at the middle of said lever I.

By making the ratchet in halves, as described, the attachment can be applied to old cars without pressing off the wheels to get the ratchet on the axle.

If desired, the device can be applied to each axle, and connected to a single draw-bar, to obviate any tendency of the wheels to slip.

Where the cars are not turned around at each end of the road, it is necessary to apply the device to each axle, forcing the ratchets and draw-bars in opposite directions.

What I claim as my invention, and desire to secure by Letters Patent, is—

The draw-bar F, provided with the stop $b$ and spring $c$, the ratchet G $f$, lever H, tangent-bolts $g$, pawl $h$, lifter-rod $h'$, bent lever $i$, pendent plate $j$, horizontal lever I, and plate $k$, all constructed and combined to rotate the axle C, substantially in the manner described.

EZRA G. GODDARD.

Witnesses:
 CHAS. T. MARTIN,
 W. S. TENNANT.